United States Patent
Schulte

(10) Patent No.: US 8,203,224 B2
(45) Date of Patent: Jun. 19, 2012

(54) POWER GENERATOR

(76) Inventor: David J. Schulte, Harbor Springs, MI (US)

( * ) Notice: Subject to any disclaimer, the term of this patent is extended or adjusted under 35 U.S.C. 154(b) by 459 days.

(21) Appl. No.: 12/534,342

(22) Filed: Aug. 3, 2009

(65) Prior Publication Data

US 2011/0025139 A1 Feb. 3, 2011

(51) Int. Cl.
*F02B 63/04* (2006.01)
*F03G 7/08* (2006.01)
*H02K 7/18* (2006.01)
*H01L 41/00* (2006.01)
*H02N 2/00* (2006.01)

(52) U.S. Cl. .......... 290/1 R; 290/1 A; 310/323.01; 310/311; 310/339; 62/6; 102/200

(58) Field of Classification Search .......... 290/1 A, 290/1 R; 310/311, 323.01, 339; 62/6; 102/200
See application file for complete search history.

(56) References Cited

U.S. PATENT DOCUMENTS

| | | | | |
|---|---|---|---|---|
| 2,578,726 A * | 12/1951 | Moore | 102/369 |
| 2,804,804 A * | 9/1957 | Cumming | 89/1.1 |
| 3,658,005 A * | 4/1972 | Byrne | 102/363 |
| 3,967,185 A * | 6/1976 | Brooks | 363/160 |
| 4,114,380 A * | 9/1978 | Ceperley | 60/721 |
| 4,355,517 A * | 10/1982 | Ceperley | 60/721 |
| 4,398,398 A * | 8/1983 | Wheatley et al. | 62/467 |
| 4,504,760 A * | 3/1985 | Yamamoto et al. | 310/323.06 |
| 4,510,411 A * | 4/1985 | Hakamata et al. | 310/316.02 |
| 4,686,407 A * | 8/1987 | Ceperley | 310/323.01 |
| 4,763,148 A * | 8/1988 | Tsukimoto et al. | 396/133 |
| 4,789,809 A * | 12/1988 | Christensen | 315/39 |
| 4,797,597 A * | 1/1989 | Bostrom | 315/39 |
| 4,961,201 A * | 10/1990 | Opower | 372/94 |
| 5,088,411 A * | 2/1992 | Kurokawa et al. | 102/200 |
| 5,167,124 A * | 12/1992 | Lucas | 62/6 |
| RE34,409 E * | 10/1993 | Hakamata et al. | 310/316.02 |
| 5,357,757 A * | 10/1994 | Lucas | 62/6 |
| 5,361,737 A * | 11/1994 | Smith et al. | 123/143 B |
| 6,152,039 A * | 11/2000 | Lee et al. | 102/200 |
| 6,556,089 B2 * | 4/2003 | Wood | 331/57 |
| 6,943,481 B2 * | 9/2005 | Okamoto et al. | 310/323.06 |
| 7,081,699 B2 * | 7/2006 | Keolian et al. | 310/311 |
| 7,161,438 B2 * | 1/2007 | Wood | 331/57 |
| 7,218,180 B2 * | 5/2007 | Wood | 331/96 |
| 7,236,060 B2 * | 6/2007 | Wood | 331/57 |
| 7,253,551 B2 * | 8/2007 | Madanshetty | 310/311 |
| 7,395,827 B2 * | 7/2008 | Madanshetty | 134/184 |
| 7,518,466 B2 * | 4/2009 | Sorensen et al. | 333/32 |
| 7,626,465 B2 * | 12/2009 | Wood | 331/57 |
| 7,675,371 B2 * | 3/2010 | Wood | 331/46 |

(Continued)

FOREIGN PATENT DOCUMENTS

GB  943404 A  12/1963

*Primary Examiner* — Pedro J Cuevas
(74) *Attorney, Agent, or Firm* — The Weintraub Group, P.L.C.

(57) ABSTRACT

The present invention provides a power generator for generating electricity comprising a core having an interior chamber, the interior chamber having a top portion and a bottom portion. The core is filled with a volume of a gas. A frequency generator is provided for resonating the gas at a high frequency, and means for securing the frequency generator to the core are provided as well. In addition, a pair of electrical conductors is connected to the core to conduct the flow of electricity away from the core.

20 Claims, 3 Drawing Sheets

U.S. PATENT DOCUMENTS

| | | | |
|---|---|---|---|
| 7,741,921 B2* | 6/2010 | Ismailov | 331/55 |
| 7,764,130 B2* | 7/2010 | Wood | 331/46 |
| 7,772,746 B2* | 8/2010 | Keolian et al. | 310/339 |
| 8,065,959 B1* | 11/2011 | Shulte | 102/473 |
| 8,081,035 B2* | 12/2011 | Wood | 331/45 |
| 8,093,869 B1* | 1/2012 | Gunderson | 322/3 |
| 8,104,406 B1* | 1/2012 | Shulte | 102/473 |
| 8,159,146 B1* | 4/2012 | Lebens et al. | 315/291 |
| 2003/0097838 A1 | 5/2003 | Yazawa et al. | |
| 2004/0069232 A1 | 4/2004 | Huang et al. | |
| 2006/0119224 A1 | 6/2006 | Keolian et al. | |
| 2007/0046391 A1* | 3/2007 | Sorensen et al. | 333/32 |
| 2007/0262676 A1* | 11/2007 | Madanshetty | 310/311 |
| 2009/0152873 A1* | 6/2009 | Gangopadhyay et al. | 290/1 R |
| 2011/0127776 A1* | 6/2011 | Schulte | 290/1 A |
| 2012/0018410 A1* | 1/2012 | Zakrzewski et al. | 219/121.48 |
| 2012/0024182 A1* | 2/2012 | Shulte | 102/363 |
| 2012/0026838 A1* | 2/2012 | Koike et al. | 367/137 |
| 2012/0049643 A1* | 3/2012 | Ryu et al. | 307/104 |
| 2012/0049648 A1* | 3/2012 | Choi et al. | 307/104 |
| 2012/0056579 A1* | 3/2012 | Kim et al. | 320/108 |

* cited by examiner

POWER GENERATOR

BACKGROUND OF THE INVENTION

1. Field of the Invention

The present invention pertains to a power generator for generating electricity. More particularly, the present invention pertains to a power generator for generating electricity by resonating a gas at a high frequency.

2. Description of the Prior Art

Various types of power generators exist in the prior art which have been used for many years. For example, fossil fuel power plants which burn fossil fuels to generate electricity have been in common use for many years. Examples of such power plants burn fuels, such as methane, coal, or petroleum, to convert combustion products (e.g., heat) into mechanical motion, which is then converted to electricity. However, some of these fuels are obtained by purchase from foreign countries, and national security concerns exist as to the power which this gives to individuals of concern. Also, concerns exist among the public as to the by-products which result from burning these fuels, and there are concerns as to the world's finite supplies of some of these fuels.

In addition, nuclear power has also been used to generate electricity for over fifty years. While the development of nuclear power technology has advanced significantly since catastrophes such as Three Mile Island, such accidents have tainted the public's perception of generating electricity by nuclear power. As a result of the political hurdles that proponents of nuclear energy now face, the world's production of electricity by nuclear power has leveled off since the Chernobyl accident in 1986.

Therefore, there remains a need for a new reliable and safe power generator, or power plant, which uses a fuel source which is cheap, readily available, and renewable, and which is safe to operate and produces minimal by-products.

The present invention, as is detailed herein below, seeks to provide a new device for generating electricity by providing a power generator which resonates a gas at a high frequency.

SUMMARY OF THE INVENTION

According to the preferred embodiment hereof, the present invention provides a power generator for generating electricity comprising: (a) a core having an interior chamber, the interior chamber having a top portion and a bottom portion, and the core being filled with a volume of a gas; (b) a frequency generator for resonating the gas at a high frequency; (c) means for securing the frequency generator to the core; and (d) a pair of electrical conductors, one of the electrical conductors connected to the top portion, and the other of the electrical conductors connected to the bottom portion, the pair of electrical conductors provided to conduct the flow of electricity away from the core.

For a more complete understanding of the present invention, reference is made to the following detailed description and accompanying drawing. In the drawing, like reference characters refer to like parts throughout the views in which:

DETAILED DESCRIPTION OF THE PREFERRED EMBODIMENT

Figure 1A:
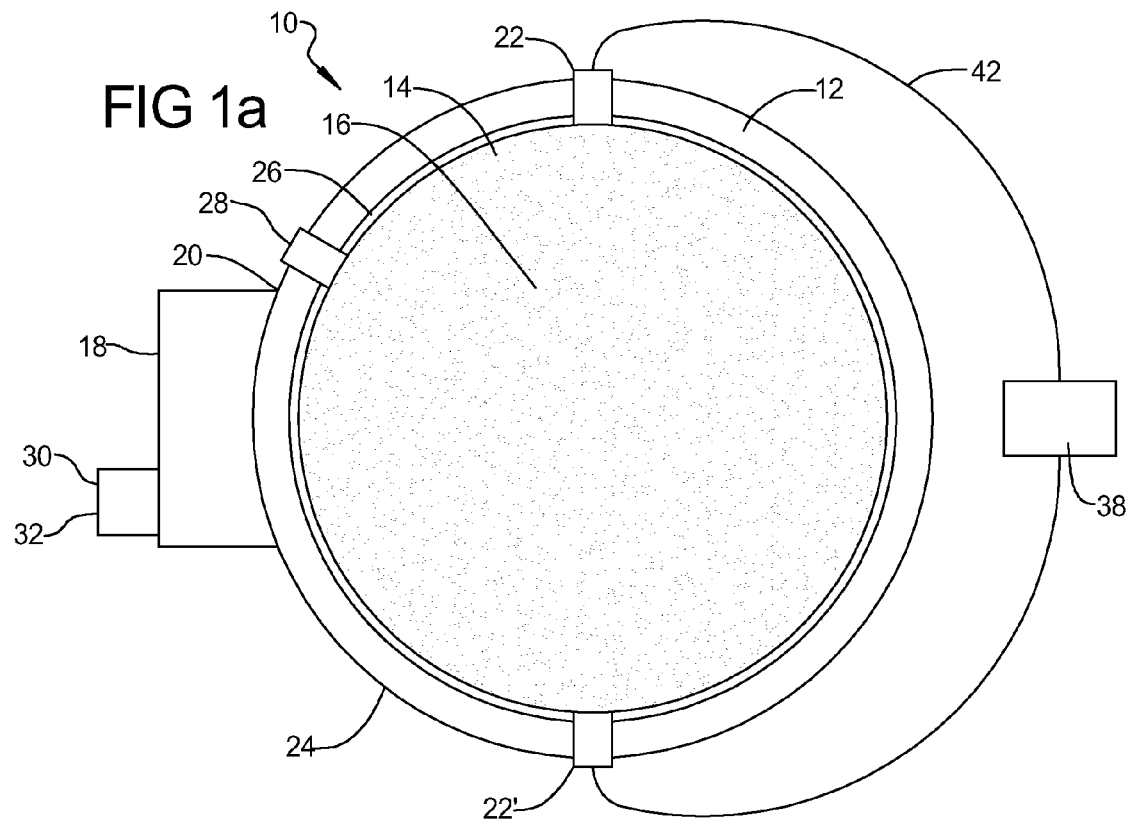
FIG. 1A is a cross-sectional view of a first embodiment of the present invention hereof.

In accordance with a first embodiment of the present invention and as shown generally in FIG. 1A, there is provided a power generator 10 for generating electricity comprising a core 12 having an interior chamber 14 which is filled with a volume of a gas 16, a frequency generator 18 for resonating the gas 16 at a high frequency, means for securing 20 the frequency generator 18 to the core 12; and a pair of electrical conductors 22,22' connected to the core 12 for conducting the generated electricity away from the core 12.

The core 12 includes the interior chamber 14 and an exterior 24. The core 12 can be of any shape which is suitable for use herewith, for example, spherical, oval, oblong, square, rectangular, pyramidal, etc. The core 12 can be any suitable shape so long as the gas 16 can achieve a standing wave resonance. The exterior 24 of the core 12 can also be shaped so that the exterior 24 geometry matches that of the interior chamber 14. The core 12 comprises any suitable material which can contain the resonating gas 16 therein, and which is beneficial to the flow of electrons from the resonating gas 16 to the electrical conductors 22,22', as discussed further below. Preferably, the core 12 is comprised of a material, such as glass, ceramic, a high-tensile strength plastic (e.g. HDPE, nylon, ABS, polycarbonate, etc.), or the like.

The size of the core 12 can be any dimension which is suitable for use with a particular embodiment (as discussed further below). However, when the interior chamber 14 is a sphere, then the radius is preferably an even-numbered divisible of $\Pi$ (i.e., 3.14159265 . . . ) or $\Phi$ (i.e., 1.6180339 . . . ), or a close approximation thereof. The size of the core 12 as used in various applications is discussed further below.

The interior chamber 14 of the core 12 is preferably covered with a lining 26 to facilitate the flow of electrons to the electrical conductors 22,22'. The lining 26 comprises any suitable material which can withstand high temperatures and has dielectric properties. Preferably, the lining 26 is a capacitive conductor. That is, the lining 26 preferably can hold an electric charge, and then release that charge to a conductive material once it has reached a supersaturated state. Accordingly, the lining 26 preferably comprises a material such as a fluoropolymer sold under the trademark Teflon®, a polyimide film sold under the trademark Kapton®, or like materials having similar conduction and heat-resistance properties.

The core 12 can include a sealed entry 28 for accessing the interior chamber 14 for both inserting the gas 16 and for removing reaction by-products. The entry 28 can comprise a hinged locking door which is properly insulated, a removable panel, or any other suitable entry for introducing gas 16 into the interior chamber 14 and removing any by-products as necessary.

For purposes which will be discussed in further detail below, the interior chamber 14 is filled with the volume of a gas 16. The gas 16 is preferably pressurized at a pressure greater than atmospheric pressure. Although any suitable gas can be used, the gas 16 is preferably a flammable light gas such as hydrogen or methane. The gas 16 is introduced into the core 12 either during assembly of the power generator 10, or via the sealed entry 28, if provided, while the power generator 10 is not in use. In addition, the power generator 10 can be plumbed with gas lines (not shown) to continuously (or periodically) pump more gas 16 into the core 12. For example, when the gas 16 is methane, the gas 16 can be pumped in from methane-producing sources, such as landfills, farms, and so forth, thereby fueling the power generator 10 with a completely renewable source.

The power generator 10 also includes a frequency generator 18 for resonating the gas 16 at a high frequency. The frequency generator 18 resonates the gas 16 molecules at an amplitude and frequency sufficient to resonate the gas 16 molecules at a single peak intensity, or a "standing wave resonance." The frequency generator 18 is any suitable type of frequency generator known in the art, such as a traveling-wave tube, a magnetron, a gyrotron, a klystron, or the like. Preferably, the frequency generator 18 is capable of outputting consistently in a narrow band of radio frequency or microwave frequency electromagnetic wavelength regions to resonate the gas 16. The type of frequency generator used will be dictated, in part, by the size of the power generator 10 deployed for any particular application. In order to sufficiently resonate the gas 16, the frequency generator 18 preferably produces a frequency of at least 2.4 GHz. The frequency generator 18 is attached to the power generator 10 as described below.

A power source 30 for operating the frequency generator 18 is also provided. The power source 30 can be a DC battery, an AC outlet, or the like. In addition, the power generator 10 itself can provide the power necessary to operate the frequency generator 18, so long as an auxiliary power source (not shown), such as a battery, is provided to initially power the frequency generator 18 until the power generator 10 has produced sufficient electricity to become self-operational. The power source 30 can be connected to the frequency generator 18 by an electrical circuit, such as a switch 32, to allow the power generator 10 to be turned on or off.

Figure 2:
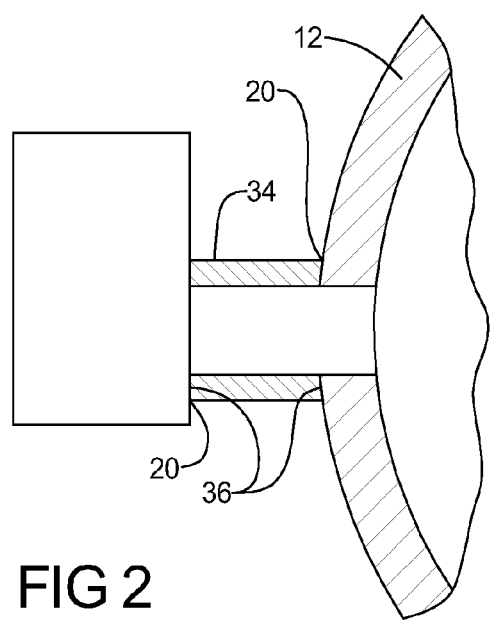
FIG. 2 is an enlarged cross-sectional view of a waveguide and the means for attaching the frequency generator to the core.
Figure 1B:
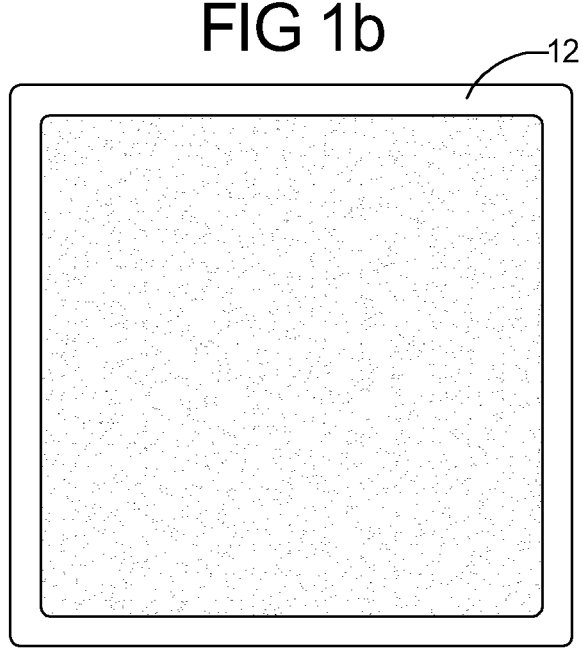
FIG. 1B is a cross-sectional view of an alternate embodiment of the core of the present invention.
Figure 1C:
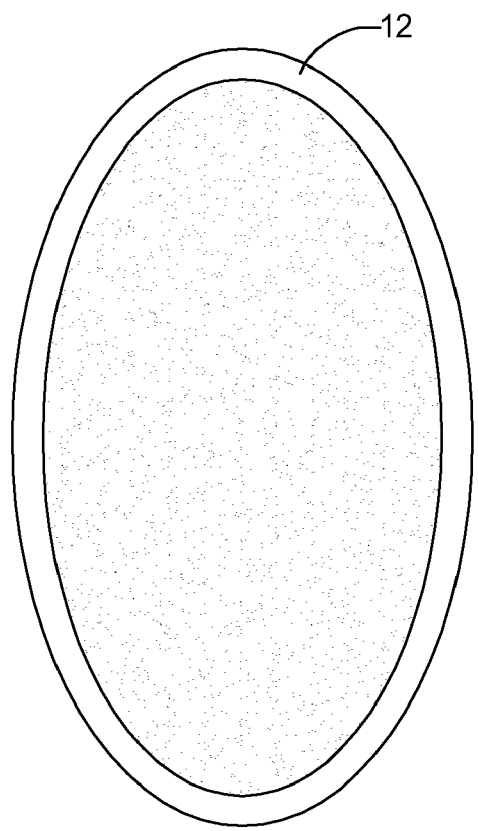
FIG. 1C is a cross-sectional view of yet another alternate embodiment of the core of the present invention.

As shown in FIG. 2, the present invention can also include a waveguide 34 for directing the extracted RF energy from the frequency generator 18 to the interior chamber 14 of the power generator 10. The waveguide 34 is a structure which guides a wave, such as an electromagnetic wave. The waveguide 34 can be formed from a material, such as cast brass or bronze, which is typically used for microwave oven apertures. The waveguide 34 is tuned for exact dimension based upon the frequency of the RF wavelength emitted. It is preferably rectangular in cross-section, however a round TWT traveling wave tube emission can also be employed. It is also noted that the waveguide 34 is not required, as the frequency generator 18 can emit electromagnetic waves directly into the core 12 of the interior chamber 14.

When a waveguide 34 is provided, the means for securing 20 can also attach the waveguide 34 to both the frequency generator 18 and the core 12. The means for securing 20 includes fasteners such as bolts, welding, or the like.

The core 12, frequency generator 18, and waveguide 34 are hermetically sealed together in order to contain the pressurized gas 16. A plurality of gaskets 36 is provided to ensure that the gas 16 remains pressurized within the interior chamber 14 of the core 12. At least one gasket from the plurality of gaskets 36 is provided as required between each of the core 12 and the waveguide 34, as well as between the waveguide 34 and the frequency generator 18.

It is to be appreciated by one having ordinary skill in the art that the gas 16 may not escape while under pressure and that the plurality of gaskets 36 is provided because the pressurized gas 16 must be properly contained within the power generator 10. Each of the gaskets in the plurality of gaskets 36 is formed from any suitable type of material known in the art for providing a hermetic seal, such as an elastomer.

In use, the frequency generator 18 resonates the gas 16 molecules to a resonant standing wave, thereby turning the gas 16 into a plasma, and allowing the gas 16 molecules' electrons to become free flowing within the plasma.

The power generator 10 also includes a pair of electrical conductors 22,22' for conducting the free electrons from the interior chamber 14 to an output 38. Preferably the electrical conductors 22,22' are spaced apart and opposed from each other, and have opposite polarity to each other. A plurality of conductors 22,22',22", etc. can be provided as well. As such, the free electrons in the resonating gas 16 are naturally attracted to the oppositely-charged electrical conductor, 22 or 22', thereby facilitating the flow of electricity as described further below. Each of the electrical conductors 22,22' have both a structure and a material-type which can conduct electricity from the interior chamber 14 to the exterior 24 of the core 12. For example, the conductors 22,22' can be directly embedded and attached to the lining 26. In addition, the electrical conductors 22,22' can comprise rods extending from the interior chamber 14 to the exterior 24 of the core 12. Preferably the rods comprise a non-metallic material, such as graphite or carbon. Any material-type which can conduct electricity and operate at high-temperatures are suitable for use as an electrical conductor.

Alternatively, rather than the pair of electrical conductors 22,22', a magnetic pickup coil (not shown) can be provided to conduct the free electrons from the interior chamber 14 to the output 38. The magnetic pickup coil can be any suitable type, such as a permanent magnet wrapped in a conductive coil. The magnetic pickup coil can be embedded in a conductive oil and secured within the core 12, such that electricity is conducted to and/or generated in the magnetic pickup coil when the gas reaches a standing wave resonance within the core 12.

Figure 3:
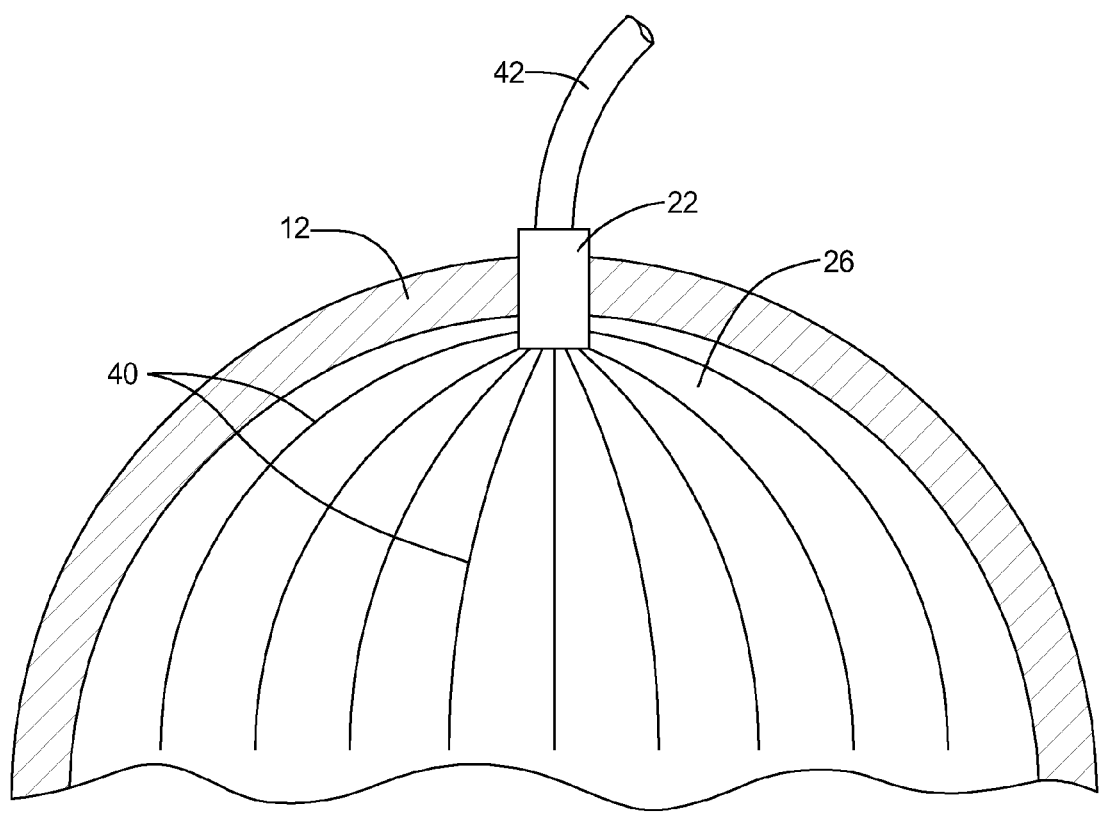
FIG. 3 is an enlarged cross-sectional view showing an embodiment of the plurality of electron receivers disposed on the interior chamber lining.

As shown in FIG. 3, a plurality of electron receivers 40 can be provided to attract and conduct the free electrons from the resonating gas 16 to at least one of the electrical conductors 22 or 22' to further aid in the flow of electricity. The plurality of electron receivers 40 are in electrical connection with at least one of the electrical conductors, 22 or 22', for the purpose of attracting free electrons from the resonating gas 16 and conducting those electrons to a respective one of the electrical conductors, 22 or 22'. The plurality of electron receivers 40 can be an array of conductive wires, a conductive film, web, matrix, and so forth which assists in attracting and conducting the free electrons from the plasma to at least one of the electrical conductors 22 or 22'. The plurality of electron receivers 40 can be imbedded within, or disposed on, the lining 26 on the interior chamber 14. The electron receivers 40 are preferably formed from a material which is conductive and resistant to high temperatures, such as certain metals. Furthermore, the plurality of electron receivers 40 can be disposed on the surface of the lining 26, can be disposed within the lining 26 and have portions which are exposed to the resonating gas 16 to attract free electrons, or any other configuration which will serve the purpose thereof.

The electrical conductors 22,22' conduct electricity to an output 38, such as a DC battery, a step-up transformer, or any other suitable type of electrical receiver which is used for storing, converting, and/or transmitting electrical current. The output 38 is connected to at least one of the electrical conductors, 22 or 22', by any suitable means for conducting 42 which is well know in the art, such as insulated copper wiring.

The power generator 10 can also be provided with means for isolating the power generator 10 from external vibration. The means for isolating can comprise a foundation such as a base or plurality of feet (not shown) which can be supported by springs, shock absorbers, shock-absorbing elastomers such as the type sold under the trademark Sorbothane®, any suitable type of viscoelastic material, or the like.

It is to be appreciated by one having ordinary skill in the art that the present invention is scalable in size for various applications, as needed. For instance, the present invention can be used to provide electricity in: small-scale applications, such as laptop computers or small household appliances for which portability is desired; medium-scale applications, such as for electric cars or for household-wide electrical production; or large-scale applications, such as providing electricity to entire buildings, or as a power plant for entire cities.

The frequency generator 18 can comprise a traveling-wave tube when the present invention is used with small-scale applications. A traveling-wave tube, or TWT, is an electronic device used to amplify radio frequency signals to high power. A TWT can produce frequencies in the range of 300 MHz to 50 GHz. A TWT is an elongated vacuum tube with a heated cathode that emits electrons at one end. A magnetic containment field around the tube focuses the electrons into a beam, which then passes down the middle of a wire helix that stretches from the RF input to the RF output, the electronic beam finally striking a collector at the other end. A directional coupler, which can be either a waveguide 34 or an electromagnetic coil, is fed with the low-powered radio signal that is to be amplified, and is positioned near the emitter, and which induces a current into the helix. The helix acts as a delay line in which the RF signal travels at approximately the same speed along the tube as the electron beam. The electrons are "bunched" together as the electromagnetic field interacts with the electron beam due to the current in the helix. The electromagnetic field then induces more current back into the helix.

In this embodiment, a solid state having an RFI source providing a frequency in the range of about 2.4 GHz to about 5.8 GHz or higher is provided by the TWT. The TWT emits the frequency into the interior chamber 14 which is filled with the gas 16, preferably, hydrogen. The gas 16 is pressurized within the core 12, at a pressure of up to or greater than, 100 psi. The mass of the gas 16 in this embodiment may be as small as 0.01 gram to provide electricity to a battery such as found in a laptop computer, although it may be larger.

When the present invention is used for medium-scale applications, the frequency generator 18 preferably comprises a magnetron.

A magnetron is a high-powered vacuum tube that generates non-coherent microwaves. A magnetron consists of a hot filament, or cathode, which is kept at or pulsed to a high negative potential by a high-voltage, direct-current power supply. The cathode is built into the center of an evacuated, lobed, circular chamber. A magnetic field parallel to the filament is imposed by a permanent magnet. The magnetic field causes the electrons, which are attracted to the positively charged outer portion of the chamber, to spiral outward in a circular path rather than moving directly to the positive anode. Spaced around the rim of the chamber are cylindrical cavities. The cavities are open along their length and connect the common chamber space. As electrons sweep past these openings they induce a resonant, high-frequency radio field in the chamber, which in turn causes the electrons to bunch into groups. A portion of this field is extracted with a short antenna that is connected to the waveguide 34.

Medium-sized applications require an output from the frequency generator 18 in the range of about 500 Watts to about 1500 Watts. A very narrow bandwidth RF output from the frequency generator 18 is emitted directly into the interior chamber 14 via the waveguide 34. The frequency generator 18 and waveguide 34 are hermetically sealed to the core 12. In this embodiment, the gas 16 is at a pressure of about 100 psi or higher, and the mass of the gas 16 can be as small as 0.5 gram, although it may be larger.

The power generator 10 for medium-sized applications, such as a portable generator and a generator equipped to provide electricity to an entire home, can provide an output of about 1500 Watts to about 50,000 Watts of continuous output.

When the present invention is used for large-scale applications, the frequency generator 18 comprises a gyrotron or a klystron.

A gyrotron is a high-powered vacuum tube which emits millimeter-wave beams by bunching electrons with cyclotron motion in a strong magnetic field. Output frequencies range from about 20 GHz to about 250 GHz, and gyrotrons can be designed for pulsed or continuous operation. A gyrotron is a type of free electron MASER (Microwave Amplification by Stimulated Emission of Radiation). It has high power at millimeter wavelengths because its dimensions can be much larger than the wavelength, unlike conventional vacuum tubes, and it is not dependent on material properties, as are conventional MASER's. Gyrotrons are often used to heat plasmas.

A klystron is a specialized linear-beam vacuum tube. Klystrons are used as amplifiers at microwave and radio frequencies to produce both low-power reference signals for superheterodyne radar receivers and to produce high-power carrier waves for communications. They are the driving force for modern particle accelerators. Klystron amplifiers have the advantage over the magnetron of coherently amplifying a reference signal so its output may be precisely controlled in amplitude, frequency, and phase. Klystrons have an output in the range of 50 megawatts at frequencies nearing 3 GHz. Many klystrons have a waveguide for coupling microwave energy into and out of the device, although it is also quite common for lower power and lower frequency klystrons to use coaxial couplings instead. In some cases a coupling probe is used to couple the microwave energy from a klystron into a separate external waveguide. Klystrons operate by amplifying RF signals by converting the kinetic energy in a DC electron beam into radio frequency power. A beam of electrons is produced by a thermionic cathode (a heated pellet of low work function material), and accelerated by high voltage electrodes (typically in the tens of kilovolts). This beam is then passed through an input chamber. RF energy is fed into the input chamber at, or near, its natural frequency to produce a voltage which acts on the electron beam. The electric field causes the electrons to bunch because electrons which pass through during an opposing electric field are accelerated while later electrons are slowed, thereby causing the previously continuous electron beam to form bunches at the input frequency. The RF current carried by the beam will produce an RF magnetic field, and this will in turn excite a voltage across the gap of subsequent resident activities. In the output chamber, the developed RF energy is coupled out. The spent electron beam, with reduced energy, is then captured in a collector.

Large-sized applications require an output from the frequency generator 18 in the range of about 1500 Watts or greater. The frequency generator 18 can emit the RF output directly into the interior chamber 14 via the waveguide 34. The frequency generator 18 can also be directly attached to the core 12 to directly emit the RF output into the core 12. The frequency generator 18 and waveguide 34 are hermetically sealed to the core 12. The interior chamber 14 of the core 12 is filled with the gas 16 pressurized to about 100 psi or higher. The mass of the gas 16 in this embodiment may be as small as 1 pound, although it may be sufficiently larger so that the power generator can provide adequate electricity for an entire metropolis, an industrial center or manufacturing plant, a naval warship, a submarine, and so forth.

The power generator 10 for large-sized applications, such as for powering industrial buildings, naval or space vessels, or to provide power to the national power grid, would provide an output of about 1500 megaWatts or more, depending upon the volume of the interior chamber 14.

In order to ensure that the power generator 10 operates at a proper temperature for peak performance and efficiency, means for cooling (not shown) can be provided as well. The means for cooling can be embodied by various structural elements. For instance, in small-scale applications such as in a laptop computer, the means for cooling can comprise the power generator 10—including the core 12 and frequency generator 18—being surrounded and embedded within an outer shell, such as a metal "strong box," to maintain both the integrity of the power generator 10 and to act as a heatsink. The means for cooling in such small-scale applications can comprise a cast metal "clamshell" type box having a top and a bottom half which are secured together by fasteners, such as screws. A gasket made from a heat conductive material can be secured between the halves of the box. In such an application, the means for cooling can be formed from metals having excellent thermal conductivity properties, such as molybdenum, molybdenum copper, tungsten, tungsten copper, and the like.

In medium-scale applications, the means for cooling can comprise heatsink fins attached directly to the exterior 24 of the core 12. The fins are formed from a material having a high thermal conductivity, such as metal. Preferably the metal used is aluminum, copper, or the like. The fins are affixed to the core 12 by a method which is conducive to the transfer of heat from the core 12 to the means for cooling, such as welding (when appropriate according to material types), fasteners (along with thermally conductive gaskets or grease), and so forth. An automated temperature control system (not shown) can be provided to operate the means for cooling to regulate the temperature of the core 12. The temperature control system can include at least one temperature sensor (e.g., a thermistor, thermocouple, etc.), means for effectuating the flow of a fluid over the fins (e.g., a fan), and a controller (e.g., processor, CPU, etc.) for turning the means for effectuating flow on and off to regulate the temperature of the core 12 within a preferable range.

In large-scale applications, the means for cooling can comprise the core 12 having a system of passageways through which a coolant may flow, such as found in the cooling system for an engine block. A coolant pump for circulating the coolant and means for cooling the coolant can also be provided. An automated system, such as described above, can be provided to ensure that the power generator 10 operates within a desired temperature range.

Although various embodiments of the invention have been disclosed for illustrative purposes, it is understood that one skilled in the art can make variations and modifications without departing from the spirit of the invention.

What is claimed is:

1. A power generator for generating electricity comprising:
   a. a core having an interior chamber, the interior chamber having a top portion and a bottom portion, and the core being filled with a volume of a gas, the interior chamber having a lining disposed thereon, and the lining comprising a dielectric material;
   b. a frequency generator for resonating the gas at a high frequency;
   c. means for securing the frequency generator to the core; and
   d. a pair of electrical conductors, a first electrical conductor from the pair of electrical conductors connected to the top portion, and a second electrical conductor from the pair of electrical conductors connected to the bottom portion, the pair of electrical conductors provided to conduct the flow of electricity away from the core.

2. The power generator of claim 1 wherein the lining is chosen from a group consisting of a fluoropolymer and a polyimide film.

3. The power generator of claim 1 wherein the gas is methane.

4. The power generator of claim 1 wherein the frequency generator resonates the gas at a frequency of at least 2.4 GHz.

5. The power generator of claim 1 wherein the frequency generator is chosen from the group consisting of a magnetron, a gyrotron, a klystron and a traveling-wave tube.

6. The power generator of claim 1 wherein the core comprises an entry for accessing the interior chamber from outside of the core.

7. The power generator of claim 1 which comprises an output, the output being in electrical connection with at least one of the electrical conductors.

8. The power generator of claim 1 comprising means for cooling the core.

9. The power generator of claim 1 comprising three or more electrical conductors.

10. A power generator for generating electricity comprising:
    a. a core having an interior chamber, the interior chamber having a top portion and a bottom portion, and the core being filled with a volume of a gas, the interior chamber having a lining disposed thereon;
    b. a frequency generator for resonating the gas at a high frequency;
    c. means for securing the frequency generator to the core;
    d. a pair of electrical conductors, a first electrical conductor from the pair of electrical conductors connected to the top portion, and a second electrical conductor from the pair of electrical conductors connected to the bottom portion, the pair of electrical conductors provided to conduct the flow of electricity away from the core; and
    e. the lining including a plurality of electron receivers which are in electrical connection with at least one of the electrical conductors.

11. The power generator of claim 10 wherein the lining is chosen from a group consisting of a fluoropolymer and a polyimide film.

12. The power generator of claim 10 wherein the frequency generator resonates the gas at a frequency of at least 2.4 GHz.

13. The power generator of claim 10 wherein the frequency generator is chosen from the group consisting of a magnetron, a gyrotron, a klystron and a traveling-wave tube.

14. The power generator of claim 10 which comprises an output, the output being in electrical connection with at least one of the electrical conductors.

15. The power generator of claim 10 comprising means for cooling the core.

16. A power generator for generating electricity comprising:

a. a core having an interior chamber, the interior chamber having a top portion and a bottom portion, and the core being filled with a volume of a gas;

b. a frequency generator for resonating the gas at a high frequency;

c. means for securing the frequency generator to the core;

d. a pair of electrical conductors, a first electrical conductor from the pair of electrical conductors connected to the top portion, and a second electrical conductor from the pair of electrical conductors connected to the bottom portion, the pair of electrical conductors provided to conduct the flow of electricity away from the core; and e. means for isolating the power generator from external vibration.

17. The power generator of claim 16 wherein the frequency generator resonates the gas at a frequency of at least 2.4 GHz.

18. The power generator of claim 16 wherein the frequency generator is chosen from the group consisting of a magnetron, a gyrotron, a klystron and a traveling-wave tube.

19. The power generator of claim 16 which comprises an output, the output being in electrical connection with at least one of the electrical conductors.

20. The power generator of claim 16 comprising means for cooling the core.

* * * * *